G. H. HERMANSEN.
FINGER EXERCISER.
APPLICATION FILED OCT. 22, 1917.
1,290,742.
Patented Jan. 7, 1919.
2 SHEETS—SHEET 1.
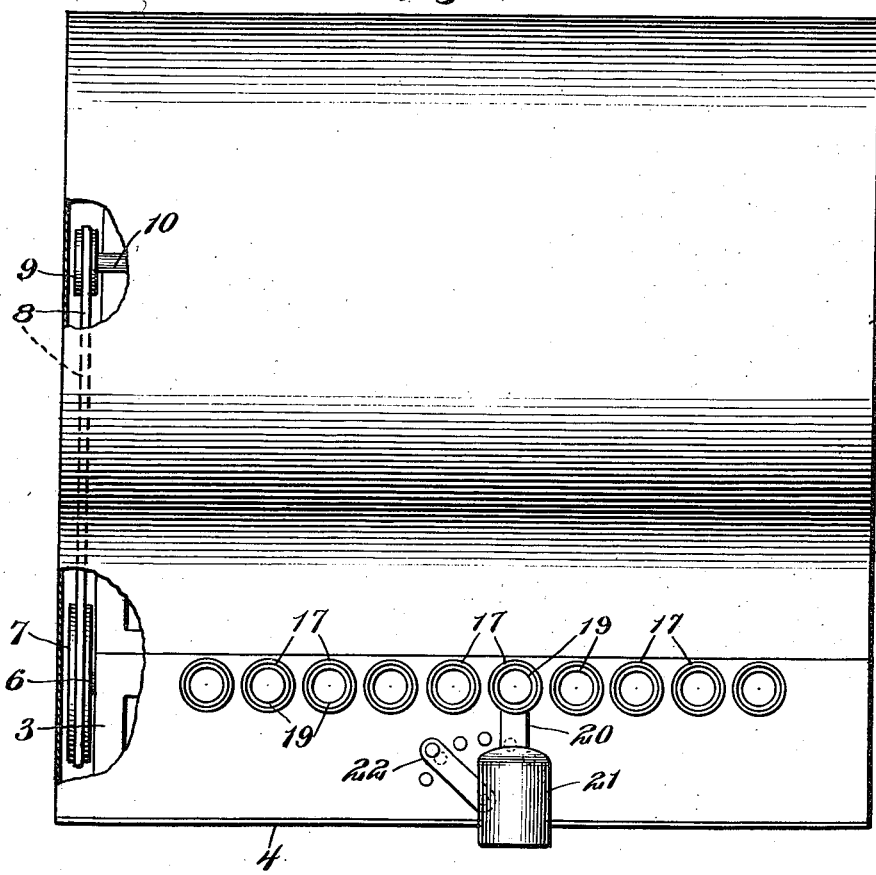
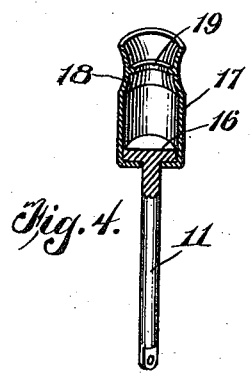
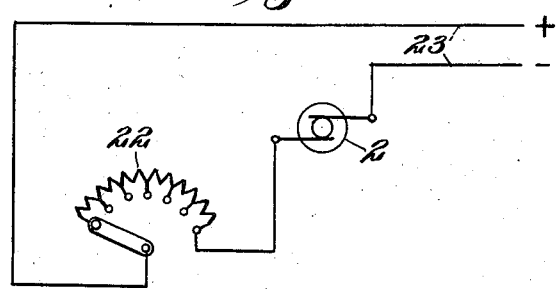
Inventor
George H. Hermansen
By
Attorney

G. H. HERMANSEN.
FINGER EXERCISER.
APPLICATION FILED OCT. 22, 1917.

1,290,742.

Patented Jan. 7, 1919.
2 SHEETS—SHEET 2.

Inventor
George H. Hermansen

By *[signature]*
Attorney

UNITED STATES PATENT OFFICE.

GEORGE H. HERMANSEN, OF SACRAMENTO, CALIFORNIA.

FINGER-EXERCISER.

1,290,742.	Specification of Letters Patent.	Patented Jan. 7, 1919.

Application filed October 22, 1917. Serial No. 197,939.

*To all whom it may concern:*

Be it known that I, GEORGE H. HERMANSEN, a citizen of the United States, residing at Sacramento, in the county of Sacramento and State of California, have invented certain new and useful Improvements in Finger-Exercisers, of which the following is a specification.

This invention relates to a finger exerciser particularly designed for the use of students of typewriting for the purpose of promoting and increasing the flexibility, muscular strength and suppleness of the fingers and thumbs, as well as to secure proper mental and muscular coördination of action, in order that great speed, accuracy and uniformity of touch may be obtained.

The primary object of the invention is to provide a finger exerciser embodying motor driven finger manipulating devices, the speed of action of which may be controlled and gradually increased as required to enable the student to manipulate the fingers at much greater speed than is possible by the use of finger technique drills.

A further object of the invention is to provide a motor-actuated exerciser whereby the fingers and thumbs may be forcibly exercised, first at a slow rate of speed and thereafter at a gradually increasing rate of speed, in order to secure the desired result.

The invention consists of the features of construction, combination and arrangement of parts, hereinafter fully described and claimed, reference being had to the accompanying drawings, in which:—

Figure 1 is a top plan view of a finger exerciser constructed in accordance with my invention.

Fig. 4 is a detail view of one of the plungers and cups.

Fig. 5 is a diagram of the electric circuit.

Figure 2:
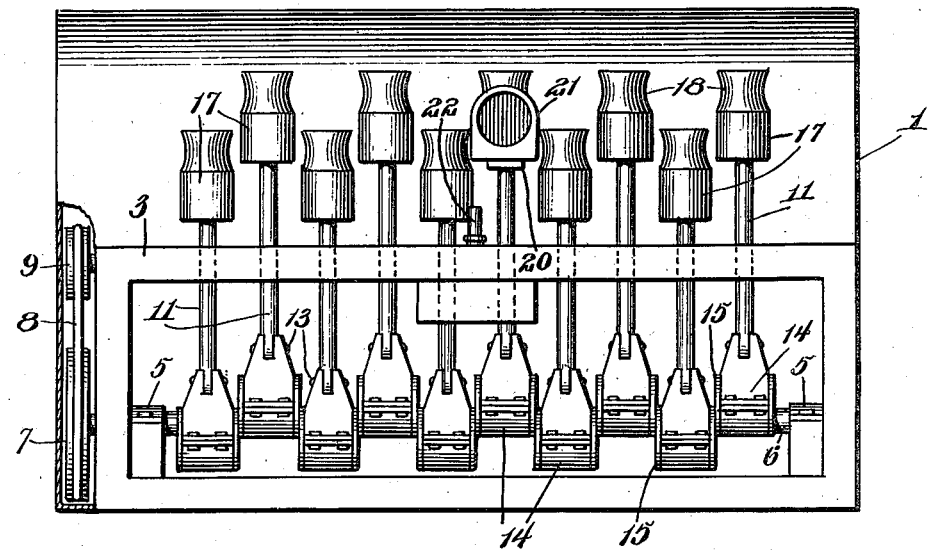
Fig. 2 is a front elevation of the same with the front plate of the casing removed.
Figure 3:
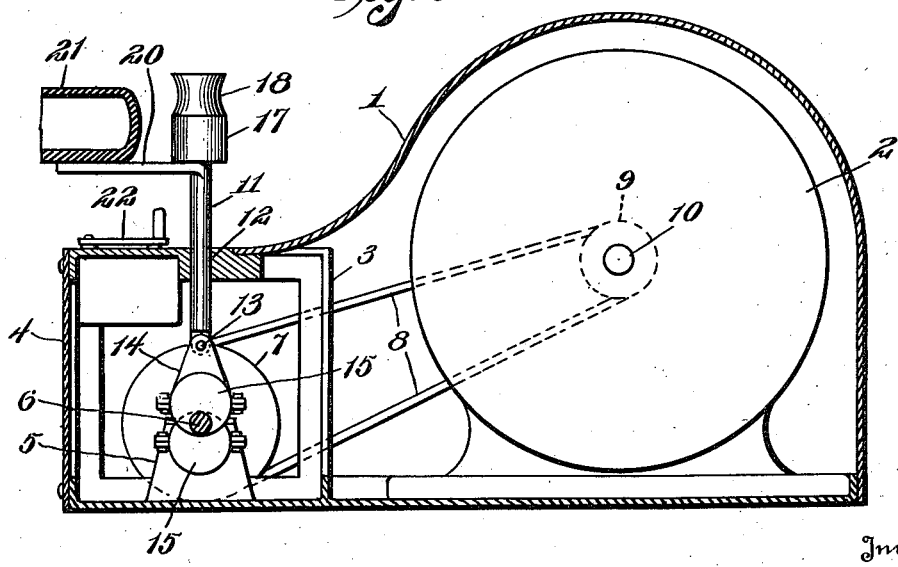
Fig. 3 is a vertical front-to-rear section through the exerciser.

In carrying my invention into practice I provide a finger exercising apparatus comprising a suitable casing 1 within the rear portion of which is arranged an electric motor 2 and within the forward portion of which is disposed a suitable frame work 3. The casing 1 may be of any size, shape or construction suitable for the purpose, and having suitable doors or openings for access to the contained working parts. In the present instance I have shown it provided with a detachable front plate 4 to enable access to be obtained to the finger exercising mechanism for the purpose of oiling the same or repairing and replacing worn or defective parts. Suitable means may be provided for furnishing access to the motor, but, as the construction of the casing itself is not material, I have not deemed it necessary to confine myself to any particular construction.

The frame work 3 is provided with suitable bearings 5 for a horizontal transverse actuating shaft 6. This shaft 6 is shown as extending at one and beyond the casing and carrying a pulley 7 connected by a belt 8 with a pulley 9 on the motor shaft 10 whereby when the motor is in action the shaft will be driven at a desired rate of speed.

The shaft 6 is constructed for imparting vibratory and reciprocatory motion to a series of finger actuating devices, each consisting of a plunger 11 movable vertically through a suitable guide opening 12 in the top of the frame work 3, the uper ends of said plungers extending above the top of the forward portion of the casing 1. Each of these plungers is pivoted at its lower end, as at 13, to provide a wrist piece or eccentric strap 14 engaging a crank, cam or eccentric 15 upon the shaft, whereby in the continuous revolution of the shaft in one direction the plungers 11 will be vibrated or reciprocated in a vertical plane.

The series of plungers are arranged in a longitudinal row, and in alinement transversely of the casing, and these plungers may correspond in number and arrangement with a row of keys of a bank of keys of a standard typewriter employing a universal key board. In the present instance I have shown the use of ten plungers or finger exercising devices, the five plungers at the right of the row being intended for exercising the fingers and thumb of the right hand, while the five plungers at the left of the row are intended for exercising the fingers and thumb of the left hand. Each of these plungers terminates at its upper end in a key or head 16 carrying a finger receptacle 17 projecting upwardly therefrom. This receptacle 17 projecting upwardly therefrom. This receptacle 17 is preferably of general cylindrical form and made of rubber or other suitable elastic material. At its upper end each receptacle is provided with an inwardly flaring or contracted portion 18 provided with one or more internal gripping ribs or surfaces 19. The receptacle 17 is adapted to snugly receive the finger, which is inserted downwardly thereinto, and is designed to serve as a suction cup and at the same time afford a mechanical gripping action, in order that the finger may be held securely against accidental displacement in the vibration of the plunger, while permitting of its release by forcible upward pull. The contracted portion 18 is adapted to expand when the finger is inserted and permit of the discharge from the cup or receptacle of air to secure a suction grip, the portion 18 then contracting above the first joint of the finger to bring the rib or projection 19 in gripping engagement therewith, whereby the cup is sealed against the admission of air to break the vacuum and at the same time affords a mechanical gripping action, whereby a firm and positive retention of the finger is secured.

The cranks or eccentrics on the actuating shaft 6 are arranged suitably at different angles to move certain fingers downwardly and others upwardly in unison, and preferably are so arranged as to operate the corresponding fingers of each hand in the same direction simultaneously to insure equilibrium of touch and mind, which is desired in instructing students to operate upon the typewriter. The arrangement of the cranks or eccentrics may be varied, however, in order that the finger exercising work may be carried out in accordance with any accepted theory of typewriter practice, and therefore I do not confine myself to any particular relative arrangement of the cranks or eccentrics upon the shaft, except when definitely set forth in the appended claims.

To one or both of the middle exercising plungers of the series may be attached an arm 20 carrying a cup or receptacle 21 to receive the thumb of one or both hands of the student. In the present instance, I have shown such a thumb receptacle applied to the first plunger of the right hand set of plungers, to enable the user to exercise the thumb of the right hand when such thumb is employed to operate the space bar, but if desired the thumb piece may be applied to the first inner actuating plunger of the left hand set for the purpose of exercising the thumb of the left hand, in the event that the user should desire to employ this thumb for the purpose of operating the space bar. In practice, the thumb piece may be made interchangeable for engagement with either of said plungers, in which event the thumb piece will be suitably constructed for detachable engagement with the plungers.

In the operation of the device, the fingers of the hands, and the thumb of one or both hands, are fitted within the cups or sockets provided upon the proper exercising plungers, and these plungers are then vibrated or reciprocated by setting the actuating shaft into motion, whereby the fingers will be manipulated in a manner closely simulating the motion they have in operating the keys of a typewriter. As the fingers are positively held connected with the plungers, it will be obvious that they will be forcibly moved upwardly and downwardly, as a result of which the fingers will be exercised to promote and increase their flexibility, muscular strength and suppleness, and in such a manner as to obtain a coördination of action between the motion of the fingers and the mind in directing them in their movements in the operation of similarly disposed keys upon a typewriter. In carrying out the exercising action, the exercising devices are first operated at a slow rate of speed, and the speed is then gradually increased as the fingers become trained until a maximum speed is reached. Any range of speed may be provided for, but it is considered desirable to provide for the operation of the keys within a speed range of from one stroke per second to thirty strokes or more per second, whereby an increased finger efficiency or manipulation of the fingers with accuracy at a far greater speed than is possible by the use of ordinary finger technique drills may be obtained. In the operation of the machine the construction of the exercising devices are always alike, and hence all the fingers of the hand are trained to operate at a corresponding speed, and with a like degree of muscular action, thus obtain a coördinated action of the finger muscles and the mind in securing the greatest possible efficiency of action in point of speed, accuracy and touch.

The means employed for controlling the action of the motor to regulate the speed of action of the exercising devices consists of a rheostat switch 22 which controls the supply of current through the electric circuit 23 from its source of supply to the motor 2 arranged in such circuit. The switch lever of this switch device may be arranged in any suitable position, but is preferably disposed so as to be operated by one of the thumbs of the student, thus when one thumb only is receiving exercising treatment, the other may be employed for operating the switch to control the speed of the motor, as well as to allow the current to be cut off when desired.

Having thus fully described my invention, I claim:

1. A finger exercising device comprising a series of vertically reciprocating plungers, means for guiding the plungers for reciprocation in fixed paths, finger receptacles carried by the upper ends of the plungers, and actuating means for reciprocating the plungers in unison, said means operating to simultaneously reciprocate some of the plungers in one direction and others in the opposite direction.

2. A finger exercising device comprising a series of rectilinearly movable finger exercising members, a rotary driving element, and connections between said rotary driving element and said finger exercising members for imparting rectilinear motion to the latter.

3. A device for exercising the fingers of the hand comprising a horizontal shaft, a series of vertically reciprocating finger exercising members arranged above the shaft, and connections between the shaft and said finger exercising members for reciprocating the latter.

4. A finger exercising device comprising a series of vertically reciprocating plungers, means for guiding the plungers for reciprocation in fixed paths, finger receptacles carried by the upper ends of the plungers, actuating means for reciprocating the plungers in unison, said means operating to simultaneously reciprocate some of the plungers in one direction and others in the opposite direction, and means for varying the speed of operation of said plunger actuating means.

5. A finger exercising device comprising a rotary shaft, a series of finger exercising plungers arranged above the shaft, said plungers being provided with finger receptacles, and means actuated by the shaft for reciprocating said plungers.

6. A finger exercising device comprising a horizontal shaft, a series of reciprocating finger exercising plungers, sectional gripping cups carried by the plungers, said cups being formed of elastic material and having contracted neck portions provided with internal projections, and means for reciprocating said finger exercising plungers from the shaft.

7. A finger exercising device comprising a series of finger exercising plungers having finger receptacles, means for actuating said plungers, and a thumb receptacle carried by and movable with one of said plungers.

8. A finger exercising device comprising a series of finger exercising plungers, means for actuating said plungers, a thumb receptacle carried by and movable with one of the plungers, and a controlling member arranged in juxtaposition to the thumb receptacle for governing the action of the driving means.

9. A device for exercising the fingers of the hand comprising a series of finger exercising plungers adapted for the engagement of the fingers therewith, and means for imparting reciprocating motion to said plungers.

10. A device for exercising the fingers of the hand comprising a series of finger exercising members, suction cups carried by said members to receive and embrace the fingers, and said cups having contracted neck portions provided with internal gripping projections, and means for communicating motion to the finger exercising member.

11. A device for exercising the fingers of the hand comprising a series of finger exercising members, elastic suction cups carried by said members to receive the fingers, said cups having finger gripping projections therein, and means for communicating motion to said finger exercising members.

12. A device for exercising the fingers of the hand, comprising a shaft, a series of vertically reciprocating finger exercising plungers, and means for reciprocating said plungers from said shaft.

13. A device for exercising the fingers of the hand comprising a shaft, a series of finger exercising plungers, cranks or eccentrics for reciprocating said plungers from said shaft, and means for operating the shaft.

14. A device for exercising the fingers of the hand comprising a shaft, a series of exercising plungers adapted to be reciprocated from the shaft, finger receiving cups carried by said plungers, and means for operating the shaft.

15. A device for exercising the fingers of the hand comprising a shaft, a series of reciprocating finger exercising devices driven from the shaft, an electric circuit, a motor in said circuit for actuating said devices, and means for controlling said circuit for driving said motor at variable speeds.

In testimony whereof I affix my signature in the presence of two witnesses.

GEORGE H. HERMANSEN.

Witnesses:
B. AURELIA HANWAY,
BENNETT S. JONES.